Sept. 23, 1930.    E. H. SCHMICKING    1,776,571
PRINT DRYING MACHINE
Filed March 2, 1929    2 Sheets-Sheet 1
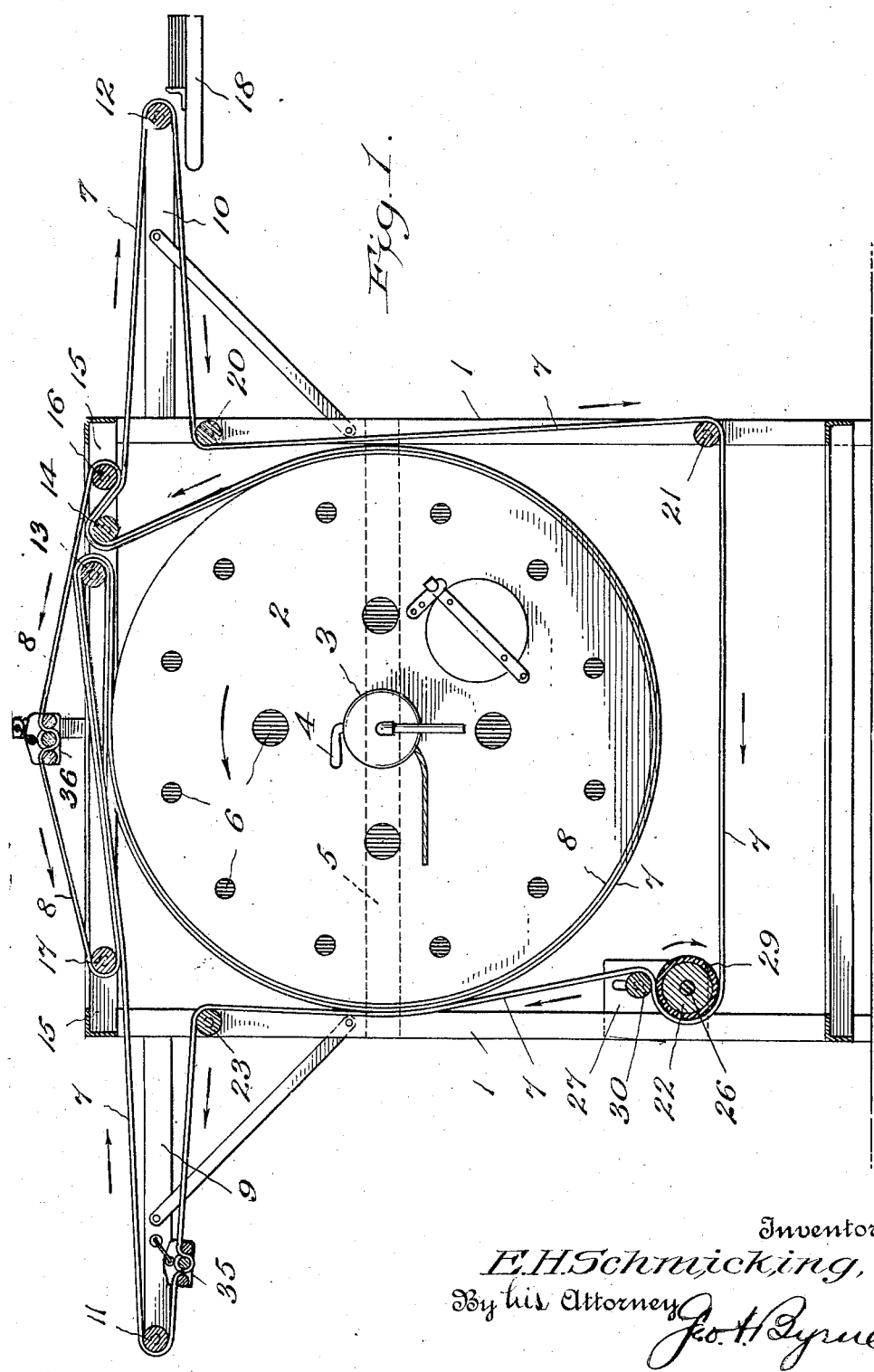
Inventor
E. H. Schmicking,
By his Attorney

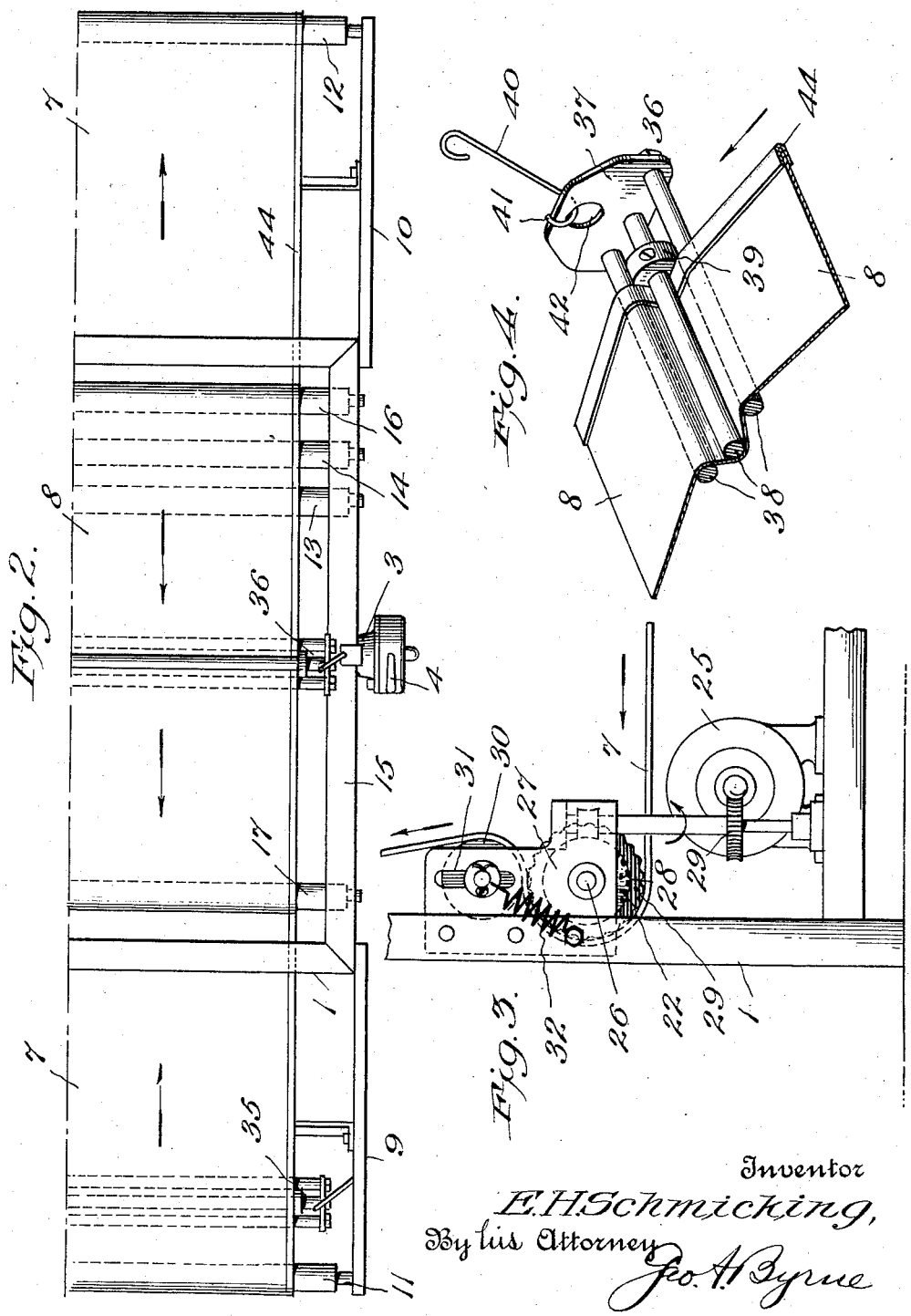

Patented Sept. 23, 1930

1,776,571

UNITED STATES PATENT OFFICE

EDWARD H. SCHMICKING, OF NEW YORK, N. Y.

PRINT-DRYING MACHINE

Application filed March 2, 1929. Serial No. 343,882.

This invention relates to machines for drying photographic prints, and has for its general object to improve that type of machine disclosed in my U. S. Patent No. 1,234,410, dated July 24, 1917.

The invention provides a machine wherein the wet prints, on entering the machine, are first subjected to a preliminary heating so that a certain amount of excess moisture may be removed therefrom before they come into contact with the heated unit.

The invention also provides a machine for eliminating the unnecessary handling of the prints after they are dried, by discharging them at the opposite end of the machine to which they are fed, and delivering them to a table in a neat flat and compacted condition.

The invention further provides a means for keeping the belts in a stretched and tight condition and for controlling the runs of the belts to keep them in their proper guided relation to each other.

The invention further provides novel combinations and arrangements of parts herein more fully set forth and defined in the appended claims.

An embodiment of the invention is illustrated in the accompanying drawings.

Figure 1 is a longitudinal sectional view of the machine with parts shown in elevation.

Fig. 2 is a top plan view of the front side of the machine.

Fig. 3 is an enlarged detail side elevational view of a lower portion of the frame and showing the means for driving the machine; and Fig. 4 is a detail perspective view of a portion of one of the belts and belt controllers.

Referring to the drawings in detail, the invention comprises a frame 1, in which is mounted a metallic drum 2, of any required size and which is adapted to be heated in any suitable manner, as for instance by a Bunsen burner 3. The burner is provided with the usual pilot light and may have arranged on its outer end a combined valve and electric switch controlled by the handle 4, so that when the handle is operated the electric motor and gas supply may be turned on and off simultaneously.

The drum 2 is horizontally disposed in the supporting frame and is rotatably mounted in suitable bearings in the cross pieces 5. A series of openings 6 are provided in the opposite sides of the drum to permit the passage of air to the gas burner.

The print carrier consists of a pair of endless belts superimposed one upon the other and hereinafter referred to as an outer belt 7 and inner belt 8. These belts are preferably formed of an absorbent material and conform in width substantially to the length of the drum 2 around which they are adapted to travel as shown.

The frame 1 is provided adjacent its upper ends with oppositely disposed lateral extensions 9 and 10, the extension 9 providing the feed end of the machine and the extension 10 providing the discharge end of the machine. Rolls 11 and 12 are mounted in the outer ends of these extensions with their axis parallel with the bearings of the drum 2. Rolls 13 and 14 are journalled in the upper side bars 15 of the frame 1, adjacent the rear end thereof and these rolls are located above and relatively close to the periphery of the drum 2. The belts 7 and 8 pass around these rolls whereby the rolls operate to cause the belts to cover substantially all except a relatively small segment of the peripheral wall of the drum so that a maximum of belt surface is exposed to the heat of the drum. This is of importance because when the drum rotates and the belts move therewith a maximum of belt surface is exposed to the heat of the drum. From roll 14 the belts are directed downwardly then under a roll 16 which is arranged adjacent the roll 14 and in horizontal alignment therewith. From the roll 16 the outer belt 7 extends to the roll 12 while the inner belt 8 passes around the roll 16 and extends over the top of the frame, to a roll 17 also journalled in the upper side bars 15 adjacent the feed end of the machine, and after passing around the roll 17 the belt 8 is then extended to and around the roll 13. This disposition of the belts 7 and 8 around the roll 16 causes the belts to separate so that the belt 7 may convey the dried prints from the machine and deliver them in a flat and compact pile on a table or other suitable support 18 located adjacent the discharge end of the machine. From the roll 12 the belt 7 is directed inwardly and over a roll 20 then downwardly and around a roll 21, both rolls being journalled in the upright side bars of the rear end of the frame. After passing around the roll 21, the belt 7 is then directed forwardly to the opposite side of the frame, and is passed around a large roll 22, which forms part of the driving mechanism to be described later. From the driving mechanism the belt 7 is directed upwardly and over a roll 23, located opposite the roll 20, and journalled in the upright side bars at the front end of the frame. After passing around the roll 23, the belt is then directed forwardly and around the roll 11, and then rearwardly to and over the roll 13. The belt 7 as it travels toward the drum passes under the roll 17, thus bringing the outer belt 7 into contact with the inner belt 8. In their superimposed relation the belts travel in substantially a horizontal plane across the top of the machine and directly above the heated drum. During this interval of travel above the heated drum, the belts are pre-heated which causes them to absorb a certain amount of excess moisture from the wet prints before they actually come into contact with the heated drum.

The means for driving the machine, as shown in Fig. 3, comprises an electric motor 25 secured to frame 1 adjacent the large drive roll 22. The roll 22 is mounted parallel with the axis of the drum and is rigidly connected to a shaft 26 mounted in suitable bearings provided in plates 27 secured to the upright side bars of the frame. A gear 28 is mounted on the shaft 26 and through suitable reduction gearing 29 connecting the gear 28 and motor 25, the shaft is driven at the proper speed. To obtain suitable traction between the roll 22 and belt 7, the periphery of the roll is covered with a relatively soft layer of corrugated rubber 29. The corrugations run lengthwise of the periphery of the roll and to insure positive traction between the roll and belt 7 an idler guide roll 30 is provided for pressing the belt into contact with the roll 22. The roll 30 has its axis journalled in slots 31 cut in the plates 27, and is mounted above the roll 22. Coil springs 32 having one end connected to the axis of the roll 30 and their other ends secured to bolts 33 mounted on the frame 1, are provided for yieldingly holding the belt 7 in contact with the drive roll 22.

To prevent the belts from running off to one side or the other from their mid-plane and to keep them in their proper guided relation to each other, belt controllers 35 and 36 are provided.

The controller 35 is preferably located adjacent the roll 11 at the feed end of the machine and is arranged for controlling the running of the outer belt 7 and the controller 36 is located at the upper central part of the frame, between the rolls 16 and 17 for controlling the inner belt 8. These controllers also take up the slack in the belts and keep them in a tight and stretched condition.

The controllers comprise end plates 37 in which are suitably secured the ends of three parallel round cross rods 38. These rods are arranged in relatively close spaced relation to each other, in substantially a horizontal plane and provide suitable guiding parts, over and under which the belt is adapted to run in a ziz-zag course or manner. The center rod is provided adjacent its ends with adjustable collars 39 against which the side edges of the belt are adapted to engage in travelling through the controller.

The controllers are preferably attached to or suspended from the frame of the machine by means of suitable tie pieces 40 which have hooked ends 41 passing through eyes 42 in the end plates 37. The tie pieces are secured to the frame so that the controller may have a floating or universal movement. If the belt should run off somewhat to one side, say for instance the right, it will move the controller along with it. The pressure against the right side will tend to draw the controller back to its initial position and this tendency will act upon the belt, and hence draw it back toward the left. In this manner, the controller will act on the belt until it becomes centered on the midplane during its travel.

The belts are provided on their side edges with reinforcing tapes 44 to insure proper stiffness and prolong the life of the belts.

When the machine is in operation, the drum and belts travel in the direction indicated by the arrows. The wet prints are arranged on the belt 7 at the feed end of the machine and are carried beneath the roll 17 and belt 8 which carry them across the top of the machine, above the heated drum where they are subjected to a preliminary heating. They are next conveyed around the heated drum, the speed of rotation being such that the heat effects the drying of the prints before they are carried by the belts to the roll 14 and away from the drum. After passing around the roll 14 they are then conveyed below the roll 16, which has the effect of curling the prints in the opposite direction and separating the inner and outer belts and leaving the prints in a flat condition on the belt 7 to be conveyed from the discharge end of the machine and delivered to the table or other suitable support 18.

What is claimed is:—

1. In a print drier, the combination of a supporting frame having lateral extensions projecting from opposite sides thereof, a drum rotatively mounted in the frame, a pair of endless belts having portions superimposed one upon the other and trained around the drum and rolls mounted on the frame and disposed so as to separate the belts and direct the outer of said belts away from the drum and around said extensions, and means mounted on the supporting frame and one of the lateral extensions for controlling the runs of the belts, said means comprising zig-zag guides between which the runs of the belts are adapted to pass.

2. In a print drier, the combination of a supporting frame, a heated drum rotatively mounted in the frame, a plurality of rollers mounted in said frame and a pair of endless belts adapted to pass over said drum and rollers, certain of said rollers disposed so as to direct a portion of the belts in superimposed relation first above the top of the drum for preheating the prints and then around the drum for finally drying the prints.

3. In a print drier, the combination of a supporting frame, a heated drum rotatively mounted in the frame, a plurality of rollers mounted in said frame and a pair of endless belts adapted to pass over said drum and rollers, certain of said rollers disposed so as to direct a portion of the belts in superimposed relation above the top of the drum and then around the drum and others of said rolls disposed so as to separate the belts and direct the outer of said belts to the opposite sides of said frame.

4. In a print drier, the combination of a supporting frame, a heated drum rotatively mounted in the frame, a plurality of rollers mounted in said frame and a pair of endless belts adapted to pass over said drum and rollers, certain of said rollers disposed so as to direct a portion of the belts in superimposed relation above the top of the drum and then around the drum and means comprising zig-zag guides mounted on the frame for controlling the runs of the belts.

5. In a print drier, the combination of a supporting frame, a heated drum rotatively mounted in the frame, a plurality of rollers mounted in said frame and a pair of endless belts adapted to pass over said drum and rollers, certain of said rollers disposed so as to direct a portion of the belts in superimposed relation above the top of the drum and then around the drum and floating belt control means comprising zig-zag guides mounted on the frame for controlling the runs of the belt.

6. In a print drier, the combination of a supporting frame having lateral extensions projecting from opposite sides thereof, a heated drum rotatively mounted in the frame, a plurality of rolls mounted in said frame and lateral extensions and a pair of endless belts adapted to pass over said drum and said rollers, certain of said rollers disposed so as to direct a portion of the belts in superimposed relation above the top of the drum and then around the drum and others of said rolls disposed so as to separate the belts and direct the outer of said belts around said extensions.

In testimony whereof I have affixed my signature.

EDWARD H. SCHMICKING.